United States Patent
Zhou et al.

(10) Patent No.: US 9,497,034 B2
(45) Date of Patent: Nov. 15, 2016

(54) METHOD FOR PRUNING A MULTICAST BRANCH, PROTOCOL INDEPENDENT MULTICAST ROUTER, AND LAYER-2 EXCHANGE

(75) Inventors: Di Zhou, Beijing (CN); Yu Liu, Beijing (CN); Qianye Chen, Beijing (CN); Xusheng Chen, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 144 days.

(21) Appl. No.: 13/876,141

(22) PCT Filed: Sep. 30, 2011

(86) PCT No.: PCT/CN2011/080482
§ 371 (c)(1),
(2), (4) Date: Mar. 26, 2013

(87) PCT Pub. No.: WO2012/041257
PCT Pub. Date: Apr. 5, 2012

(65) Prior Publication Data
US 2013/0201988 A1 Aug. 8, 2013

(30) Foreign Application Priority Data

Sep. 30, 2010 (CN) .......................... 2010 1 0502531
Dec. 21, 2010 (CN) .......................... 2010 1 0613223

(51) Int. Cl.
*H04L 12/18* (2006.01)
*H04L 12/761* (2013.01)
*H04L 12/801* (2013.01)

(52) U.S. Cl.
CPC ............. *H04L 12/18* (2013.01); *H04L 12/185* (2013.01); *H04L 45/16* (2013.01); *H04L 47/15* (2013.01)

(58) Field of Classification Search
None
See application file for complete search history.

(56) References Cited

U.S. PATENT DOCUMENTS 6,785,274 B2 * 8/2004 Mahajan ............. H04L 12/4641
370/390
6,847,638 B1 * 1/2005 Wu et al. ...................... 370/389
(Continued)

FOREIGN PATENT DOCUMENTS

CN   1863147    11/2006
CN   1889448    1/2007
(Continued)

OTHER PUBLICATIONS

Extended European Search Report dated Apr. 7, 2015, EP Patent Application No. 11828153.4 dated Sep. 30, 2011, European Patent Office.
(Continued)

*Primary Examiner* — Huy D Vu
*Assistant Examiner* — Hong Shao
(74) *Attorney, Agent, or Firm* — Hewlett Packard Enterprise Patent Department

(57) ABSTRACT

According to an example, a multicast source may be connected to a first hop Protocol Independent Multicast (PIM) router via one or multiple layer-2 switches that has PIM functions. A first hop PIM router may receive a multicast flow initiated by the multicast source, send a PIM prune message via a port from which the multicast flow is received in response to a determination that the multicast flow is not to be received, or the first hop PIM router may receive a PIM prune message for a multicast flow from a downstream PIM router or a multicast group leave message for a multicast flow from a client connected to the first hop PIM router and delete a port via which the PIM prune message.

21 Claims, 11 Drawing Sheets

(56) References Cited

U.S. PATENT DOCUMENTS

| | | | |
|---|---|---|---|
| 7,389,359 B2* | 6/2008 | Jain | H04L 12/1886 709/238 |
| 7,590,115 B1 | 9/2009 | Aggarwal et al. | |
| 8,099,516 B1* | 1/2012 | Cai | 709/245 |
| 8,644,310 B2* | 2/2014 | Fernandez Gutierrez | 370/390 |
| 8,761,044 B2* | 6/2014 | Chandrashekharachar Suvarneshwar | 370/254 |
| 2008/0205397 A1 | 8/2008 | Xu | |

FOREIGN PATENT DOCUMENTS

| | | |
|---|---|---|
| CN | 1889477 | 1/2007 |
| CN | 101291240 | 10/2008 |
| CN | 101340305 | 1/2009 |
| CN | 102075417 | 5/2011 |
| JP | 2006-087014 | 3/2006 |
| JP | 2009-021940 | 1/2009 |
| JP | 2009-246845 | 10/2009 |
| WO | WO-03036503 | 5/2003 |
| WO | WO-2009056175 | 5/2009 |
| WO | WO-2010072611 | 7/2010 |

OTHER PUBLICATIONS

D. Zhou et al., "Unnecessary Multicast Flooding Problem Statement draft-dizhou-pim-umf-problem-statement-00", IETF draft, 15 pages, Aug. 17, 2010.

English Abstract of "The Research and Implement of Mulitcaist Route Protocol PIM-SM", Sep. 8, 2004.

First Office Action dated Jan. 6, 2013 issued on CN Patent Application No. 201010613223.7 filed on Dec. 21, 2010, The State Intellectual Property Office of the P.R. China.

International Search Report dated Jan. 5, 2012 issued on PCT Patent Application No. PCT/CN2011/080482 filed on Sep. 30, 2011, The State Intellectual Property Office, the P.R. China.

Tao, Li, English Abstract of "Research and Implementation of PIM-DM Multicast Routing Protocol", Sep. 22, 2006.

* cited by examiner

METHOD FOR PRUNING A MULTICAST BRANCH, PROTOCOL INDEPENDENT MULTICAST ROUTER, AND LAYER-2 EXCHANGE

CLAIM FOR PRIORITY

The present application is a national stage filing under 35 U.S.C 371 of PCT application number PCT/CN2011/080482, having an international filing date of Sep. 30, 2011, which claims priority to Chinese Patent Application No. 201010613223.7, filed on Dec. 21, 2010 and Chinese Patent Application No. 201010502531.2, filed on Sep. 30, 2010, the disclosures of which are hereby incorporated by reference in its entirety.

BACKGROUND

For facilitating understanding, the following concepts are first explained.

Multicast: a communication manner in contrast with unicast and broadcast. A multicast system includes a multicast source, one or multiple receivers and a multicast group. The source host sends data only once, and the destination address of the data is the address of the multicast group. Each receiver in the multicast group receives a copy of the data, and only the receivers in the multicast group can receive the data.

IGMP (Internet Group Management Protocol): a protocol for managing IP multicast members in the TCP/IP (Transmission Control Protocol/Internet Protocol) protocol family, which is for establishing and maintaining relations of multicast group members between an IP host and adjacent multicast routers.

IGSP (Internet Group Management Protocol Snooping): a multicast restriction scheme running in layer-2 devices, which is for managing and controlling multicast groups. A layer-2 device which runs IGMP snooping analyzes a received IGMP packet, establishes a mapping relation between a port and a multicast MAC (Media Access Control) address, and forwards multicast data according to the mapping relation.

PIM: a protocol which provides IP multicast routing by utilizing a unicast routing table established using static routing or any unicast routing protocol such as RIP, OSPF, IS-IS, BGP and so on, and is for maintaining propagation of multicast data between layer-three devices. PIM protocol has four modes, i.e., PIM-DM (Dense Mode), PIM-SM (Spare Mode), PIM-SSM (Source-Specific Multicast) and bi-directional PIM.

IP multicast techniques effectively solve problems existing in one-to-many transmissions, implement efficient one-to-many data transmission in an IP network, and can save a large amount of network bandwidth and reduce network loads. Some new value-added services, including Internet information services, such as online live broadcast, IPTV, remote education, Telemedicine, internet radio, real-time video conference, and so on, are able to gain greater development by taking advantage of the multicast functions of the network.

DETAILED DESCRIPTION OF EXAMPLES

The PIM protocol is the currently prevailing multicast routing protocol in use today. IGMP snooping and PIM snooping are also commonly adopted layer-2 multicast control protocols. PIM snooping, whose importance is only below that of IGMP snooping, is for snooping PIM hello messages, PIM join messages, and PIM prune messages to control the forwarding of a multicast flow to intended routers. PIM snooping exchanges, however, may produce positive outcomes only when deployed between PIM routers, but may not achieve the same outcomes when deployed between a multicast source and a PIM router.

Figure 1:
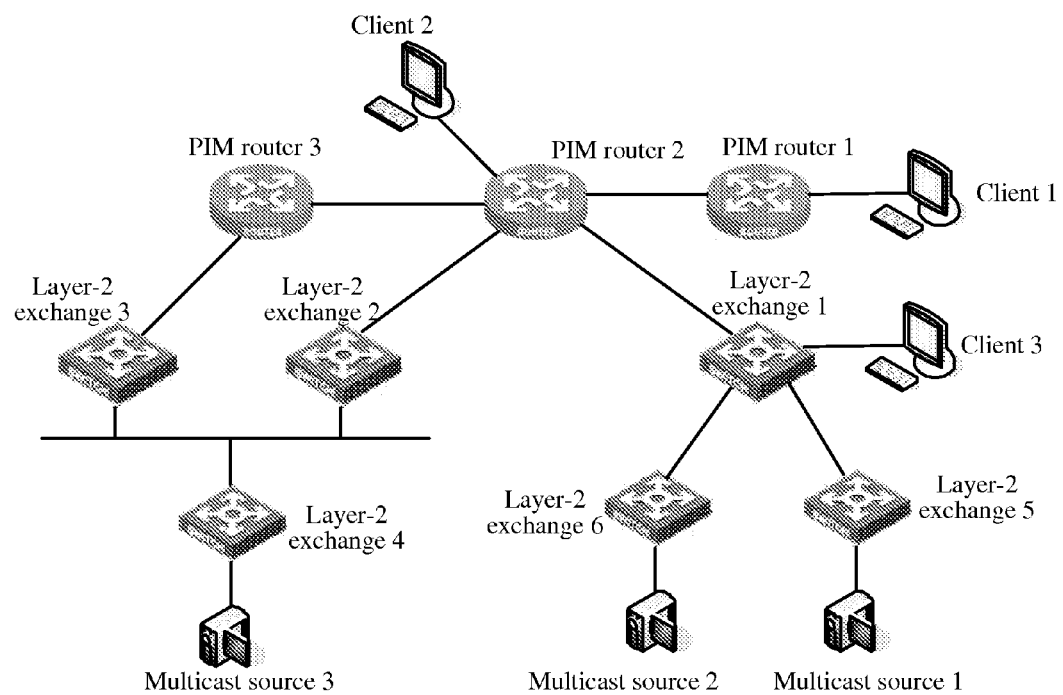
FIG. 1 is a schematic diagram illustrating a structure of a multicast network.

Regarding multicast applications that operate under a mechanism similar to that of VOD (Video On Demand), traffic control at the multicast source side remains a problem to be solved in the industry. FIG. 1 is a schematic diagram illustrating a structure of a multicast network. As shown in FIG. 1, a multicast source accesses the network via one or more layer-2 exchanges, and a client accesses the network via a layer-2 exchange or a PIM router. In addition, multiple layer-2 exchanges converge at a PIM router. For example, multicast sources 1 and 2 access the network respectively via layer-2 exchanges 5 and 6, and layer-2 exchanges 1 and 2 converge at PIM router 2.

When a multicast flow initiated from a multicast source reaches a first hop PIM router via one or multiple exchanges, the PIM router may send a source register message to an RP (Rendezvous Point) if the PIM router is a DR (Designated Router). When the RP detects that an (S,G) entry corresponding to the multicast flow, i.e., an entry recording the source address and group address of the multicast flow, has not been established in the RP, which indicates no client subscribes to the multicast flow, the RP sends a source quench message to the DR. After that, when a client subscribes to the multicast flow, the client sends an IGMP join message to a leaf router, and the leaf router sends a PIM join message to the RP. After receiving the PIM join message, the RP sends a PIM join message to the DR, and subsequently, the multicast flow reaches the multicast receiver via the RP.

The first hop PIM router refers to the first PIM router encountered by the multicast flow from the multicast source. The RP is a PIM router providing centralized management of multicast flow information, and acts as a medium between multicast sources and multicast receivers.

In conventional networks, a multicast flow from a multicast source, whether subscribed to or not by any clients, is first sent to a first hop PIM router via one or multiple exchanges, which increases cache memory consumption in the exchanges. Cache memory for egress ports of an exchange plays an important role in keeping service flows, especially those with bursts such as videos and so on, in order, in preventing packet loss and in reducing jitter. Therefore, forwarding of data flows whose forwarding is not necessary should be prevented to reduce the consumption of cache memory for egress ports of an exchange. Current protocols, however, cannot prune off unnecessary multicast flows between a multicast source and a PIM router on the data link layer.

Some examples will be described in detail with reference to accompanying drawings.

In some examples, it is assumed that the whole network adopts the same version of a multicast group management protocol, e.g., adopts one of IGMPv2, IGMPv3, MLDv1 (Multicast Listener Discovery Protocol Version 1) and MLDv2.

When IGMPv2 or MLDv1 is adopted in this example, a multicast flow is identified by a multicast group identification. However, when IGMPv3 or MLDv2 is adopted, a multicast flow is identified by a multicast source identification+a multicast group identification.

In some examples, the adopted PIM protocol is PIM-SSM or PIM-DM. When PIM-SSM is adopted, the adopted IGMP version is IGMPv3, in which the IGSP version is IGMPv3 snooping.

In some examples, a layer-2 exchange with PIM snooping functions has a new role for ports, i.e., prune ports. When a layer-2 exchange with PIM snooping functions receives a PIM prune message from a first hop PIM router for a multicast flow, the port receiving the message is set as a prune port. Afterwards, the multicast flow is prohibited from being forwarded to the prune port.

A layer-2 exchange supporting multicast has four roles for ports, i.e., router ports and membership ports for IGMP snooping, prune ports and upstream ports for PIM snooping. A router port is a downstream port, i.e., a port receiving a PIM join message. The downstream ports are called router ports because they perform the same functions, i.e., connecting routers, forwarding all multicast flows.

The four roles of the ports are maintained respectively with respect to each other. When a port plays all or any two of three roles of a membership port, a prune port, and a router port at the same time, the priority order of the roles are membership port, prune port and router port in a descending order of priority. For layer-2 forwarding table entries, i.e., PIM snooping entries and IGMP snooping entries, a rule of processing such a port includes: adding the port into the entries when the role with the highest priority of the port is a membership port, and not adding the port to the entries when the role with the highest priority of the port is a prune port. In addition, if the only role of a port is a router port, it is assumed that the role with the highest priority of the port is a router port, and the port is added into the layer-2 forwarding table entries.

If an upstream neighbor list in a PIM snooping table entry of a layer-2 exchange is empty, no upstream port of the layer-2 exchange should be added into a downstream egress port list in the PIM snooping table entry. A PIM snooping table entry includes: an (S,G) entry, an upstream neighbor list, a down stream neighbor list, and so on.

The following example adopts IGMP as its multicast group management protocol. It should be understood that when MLD protocol is adopted, replacement of all "IGMP" in the following description with "MLD" is only required.

Figure 2:
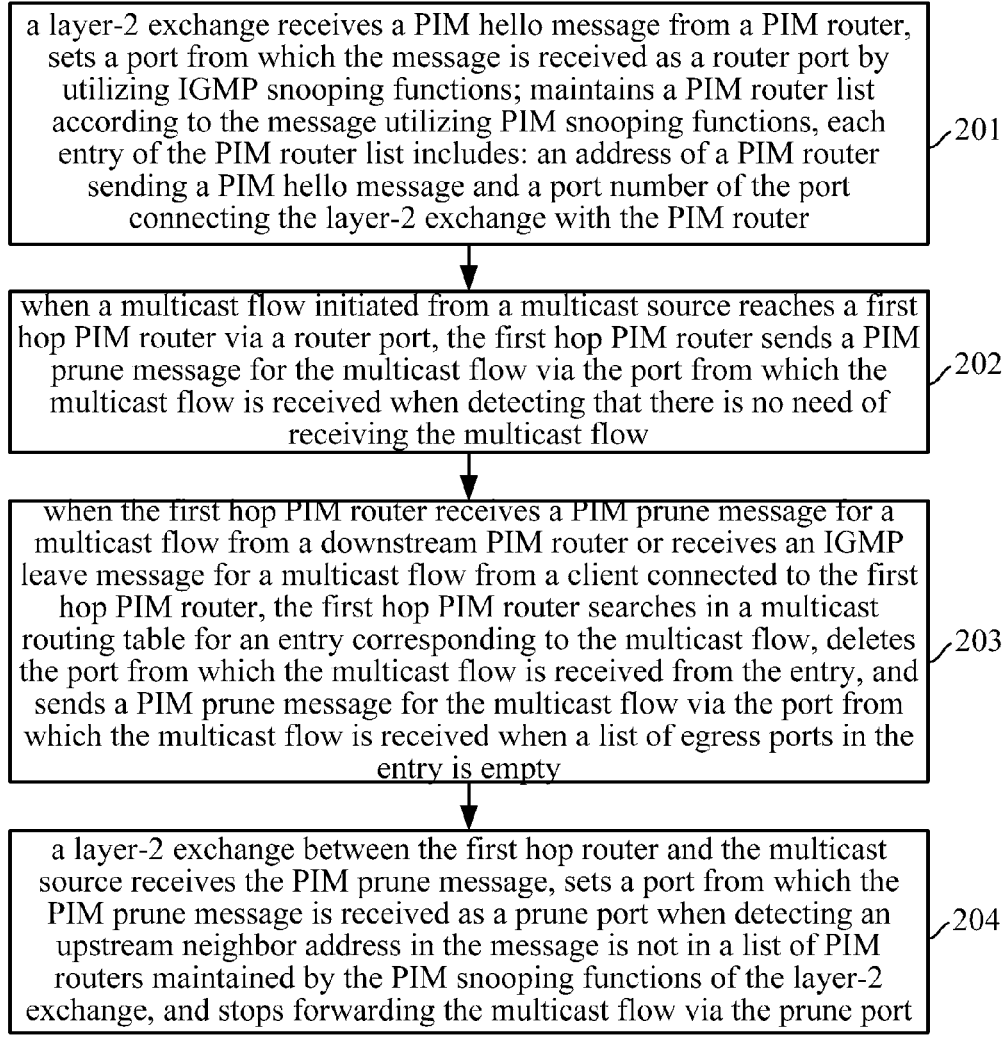
FIG. 2 is a flowchart illustrating a method for pruning a multicast branch according to an example.

FIG. 2 is a flowchart illustrating a method for pruning a multicast branch according to an example. As shown in FIG. 2, the method may include the following operations.

At block 201, a layer-2 exchange receives a PIM hello message from a PIM router, sets a port from which the message is received as a router port by utilizing IGMP snooping functions, and maintains a PIM router list according to the message by utilizing PIM snooping functions. Each entry of the PIM router list includes: an address of a PIM router sending a PIM hello message and a port number of the port connecting the layer-2 exchange with the PIM router.

The address of the PIM router sending the PIM hello message may be obtained from a source address field in the PIM hello message. The port number of the port connecting the layer-2 exchange with the PIM router refers to the port number from which the PIM hello message is received by the layer-2 exchange.

In a PIM router, a port adopting a PIM protocol may send a PIM hello message at intervals to an external device.

After receiving the PIM hello message, the layer-2 exchange may forward the message to other layer-2 exchanges, and other layer-2 exchanges also perform the operations at block 201 after receiving the message.

At block 202, when a multicast flow initiated from a multicast source reaches a first hop PIM router via a router port, the first hop PIM router sends a PIM prune message for the multicast flow via the port from which the multicast flow is received when a determination that receipt of the multicast flow is not required is made.

At block 203, when the first hop PIM router receives a PIM prune message for a multicast flow from a downstream PIM router or receives an IGMP leave message for a multicast flow from a client connected to the first hop PIM router, the first hop PIM router searches in a multicast routing table for an entry corresponding to the multicast flow, deletes the port from which the multicast flow is received from the entry, and sends a PIM prune message for the multicast flow via the port from which the multicast flow is received when a list of egress ports in the entry is empty.

The frequency at which the PIM prune message is sent at blocks 202 and 203 is restricted, i.e., the PIM prune message will not be repetitively sent within a short time when the same multicast flow is continuously received. The default time interval between each transmission of the PIM prune message is one minute. The transmission of the PIM prune message is stopped when the branch of the multicast flow is pruned off or a new demand for the multicast flow is received from local clients.

At block 204, a layer-2 exchange between the first hop router and the multicast source receives the PIM prune message, sets a port from which the PIM prune message is received as a prune port when detecting an upstream neighbor address in the message is not in a list of PIM routers maintained by the PIM snooping functions of the layer-2 exchange, and stops forwarding the multicast flow via the prune port.

From FIG. 2 it may be seen that a multicast flow between a multicast source and a first hop PIM router is pruned off when:

1. there is no demand for receipt of the multicast flow;
2. there was a demand for receipt of the multicast flow, but at the moment a request to stop receipt of the multicast flow has been received.

Figure 3:
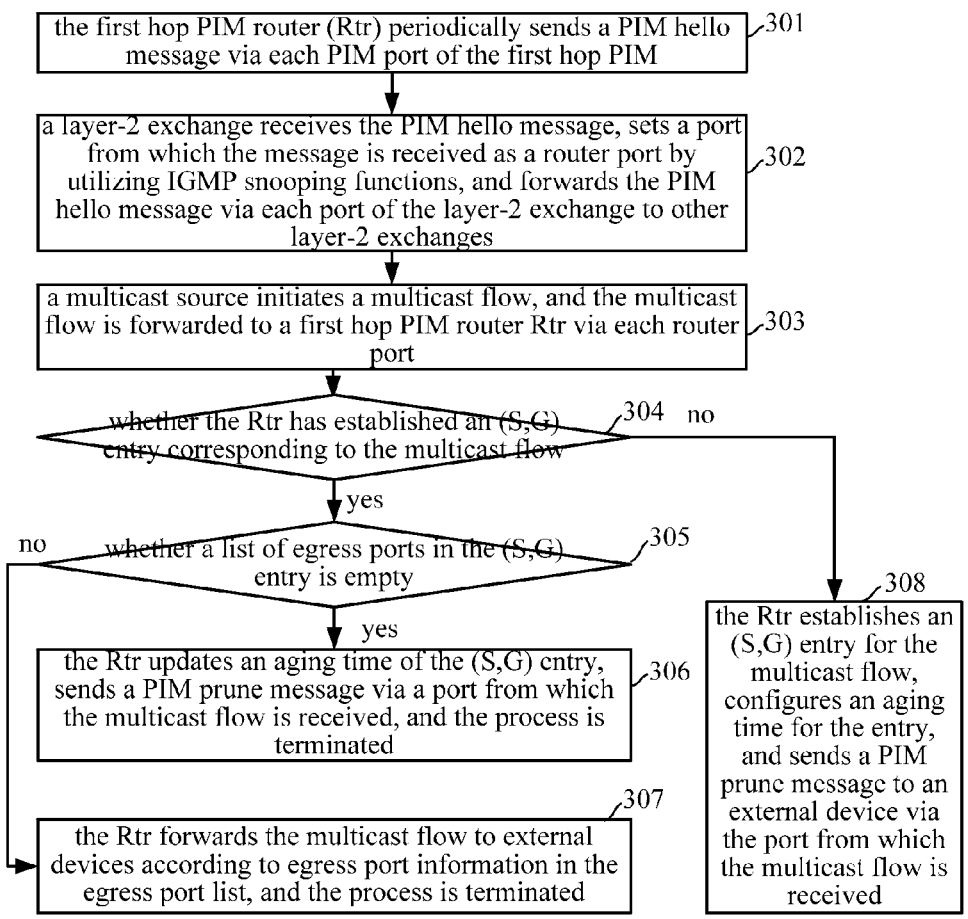
FIG. 3 is a flowchart illustrating a process performed by a first hop PIM router adopting PIM-SSM after receiving a multicast flow according to an example.
Figure 4:
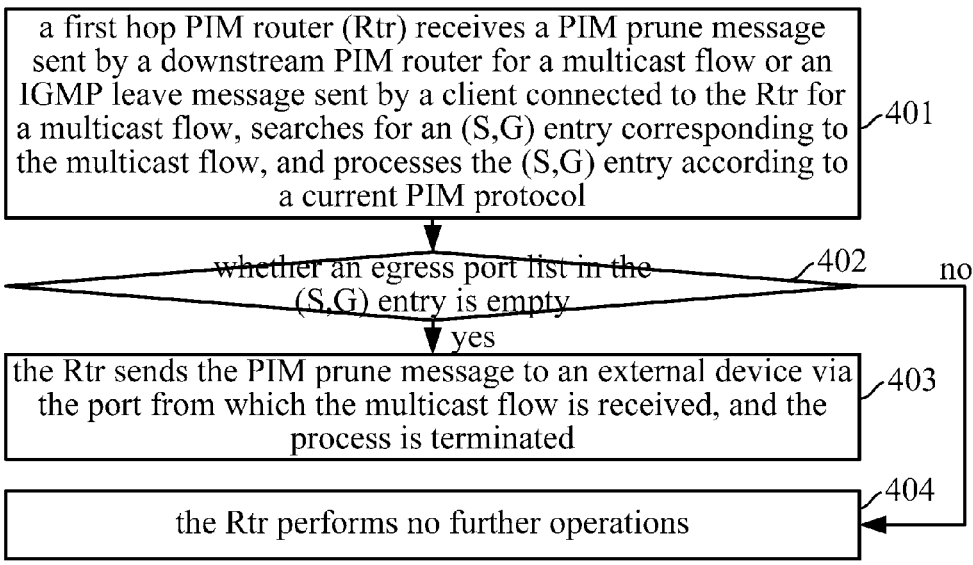
FIG. 4 is a flowchart illustrating a process performed by a first hop PIM router adopting PIM-SSM after receiving a PIM prune message from a downstream PIM router or an IGMP leave message from a client served by the first hop PIM router according to an example.

FIG. 3 and FIG. 4 respectively illustrate detailed processing procedures of the above two types of multicast flow by a first hop PIM router adopting PIM-SSM.

FIG. 3 is a flowchart illustrating a process performed by a first hop PIM router adopting PIM-SSM after receiving a multicast flow according to an example. As shown in FIG. 3, the process may include the following operations.

At block 301, the first hop PIM router (Rtr) periodically sends a PIM hello message via each PIM port of the first hop PIM.

At block 302, a layer-2 exchange receives the PIM hello message, sets a port from which the message is received as a router port by utilizing IGMP snooping functions, and forwards the PIM hello message via each port of the layer-2 exchange to other layer-2 exchanges.

IGMP snooping is the common characteristic of all layer-2 exchanges supporting multicast. An exchange with IGMP snooping functions regards a port from which an IGMP general query message or a PIM packet is received as a router port, and regards a port from which an IGMP join message is received as a membership port. An exchange with IGMP snooping functions may send all received multicast flows to a router port, and send a multicast flow of a multicast group only to a membership port.

Other layer-2 exchanges may also perform the operations at block 302 after receiving the PIM hello message.

At block 303, a multicast source initiates a multicast flow, and the multicast flow is forwarded to a first hop PIM router (Rtr) via each router port.

At block 304, the Rtr determines whether the Rtr has established an (S,G) entry corresponding to the multicast flow, and performs operations at block 305 when the entry has been established, or performs operations at block 308 when the entry has not been established.

At block 305, the Rtr determines whether a list of egress ports in the (S,G) entry is empty, performs operations at block 306 when the list is empty, or performs operations at block 307 when the list is not empty.

At block 306, the Rtr updates an aging time of the (S,G) entry, sends a PIM prune message via a port from which the multicast flow is received, and the process is terminated.

The upstream neighbor address of the PIM prune message is the IP address of the multicast source, the destination IP address is the IP address of the multicast source and the destination MAC address is the MAC address of the multicast source.

Since the PIM prune message is sent from the port via which the multicast flow enters the Rtr, the PIM prune message will reach a layer-2 exchange between the multicast source and the Rtr. The layer-2 exchange may perform the processing procedures shown in FIG. 5 after receiving the PIM prune message.

At block 307, the Rtr forwards the multicast flow to external devices according to egress port information in the egress port list, and the process is terminated.

At block 308, the Rtr establishes an (S,G) entry for the multicast flow, configures an aging time for the entry, and sends a PIM prune message to an external device via the port from which the multicast flow is received.

The aging time of the (S,G) entry is generally configured as three minutes.

The upstream neighbor address of the PIM prune message is the IP address of the multicast source, the destination IP address is the IP address of the multicast source and the destination MAC address is the MAC address of the multicast source.

If PIM-SM is adopted, in this block, the Rtr may further send a source register message for the multicast flow to an RP.

FIG. 4 is a flowchart illustrating a process performed by a first hop PIM router adopting PIM-SSM after receiving a PIM prune message from a downstream PIM router or an IGMP leave message from a client connected to the first hop PIM router according to an example. As shown in FIG. 4, the process may include the following operations.

At block 401, the first hop PIM router (Rtr) receives a PIM prune message sent by a downstream PIM router for a multicast flow or an IGMP leave message sent by a client connected to the Rtr for a multicast flow, searches for an (S,G) entry corresponding to the multicast flow, and processes the (S,G) entry according to the PIM protocol.

When a multicast receiver ceases to receive a multicast flow, the multicast receiver may send an IGMP leave message for the multicast flow to a leaf router of the multicast receiver. The leaf router sends a PIM prune message to an RP for the multicast flow after receiving the IGMP leave message. The RP forwards the PIM prune message in the direction of the first hop PIM router.

According to a current PIM protocol, the Rtr generally deletes a port from which the PIM prune message is received from a list of egress ports in the (S,G) entry.

At block 402, the Rtr determines whether an egress port list in the (S,G) entry is empty, performs operations at block 403 when the list is empty, or performs operations at block 404 when the list is not empty.

At block 403, the Rtr sends the PIM prune message to an external device via the port from which the multicast flow is received, and the process is terminated.

The upstream neighbor address of the PIM prune message is the IP address of the multicast source, the destination IP address is the IP address of the multicast source and the destination MAC address is the MAC address of the multicast source.

Since the PIM prune message is sent from the port via which the multicast flow enters the Rtr, the PIM prune message will reach the layer-2 exchange between the multicast source and the Rtr. The layer-2 exchange may perform the processing procedures shown in FIG. 5 after receiving the PIM prune message.

At block 404, the Rtr performs no further operations.

Figure 5:
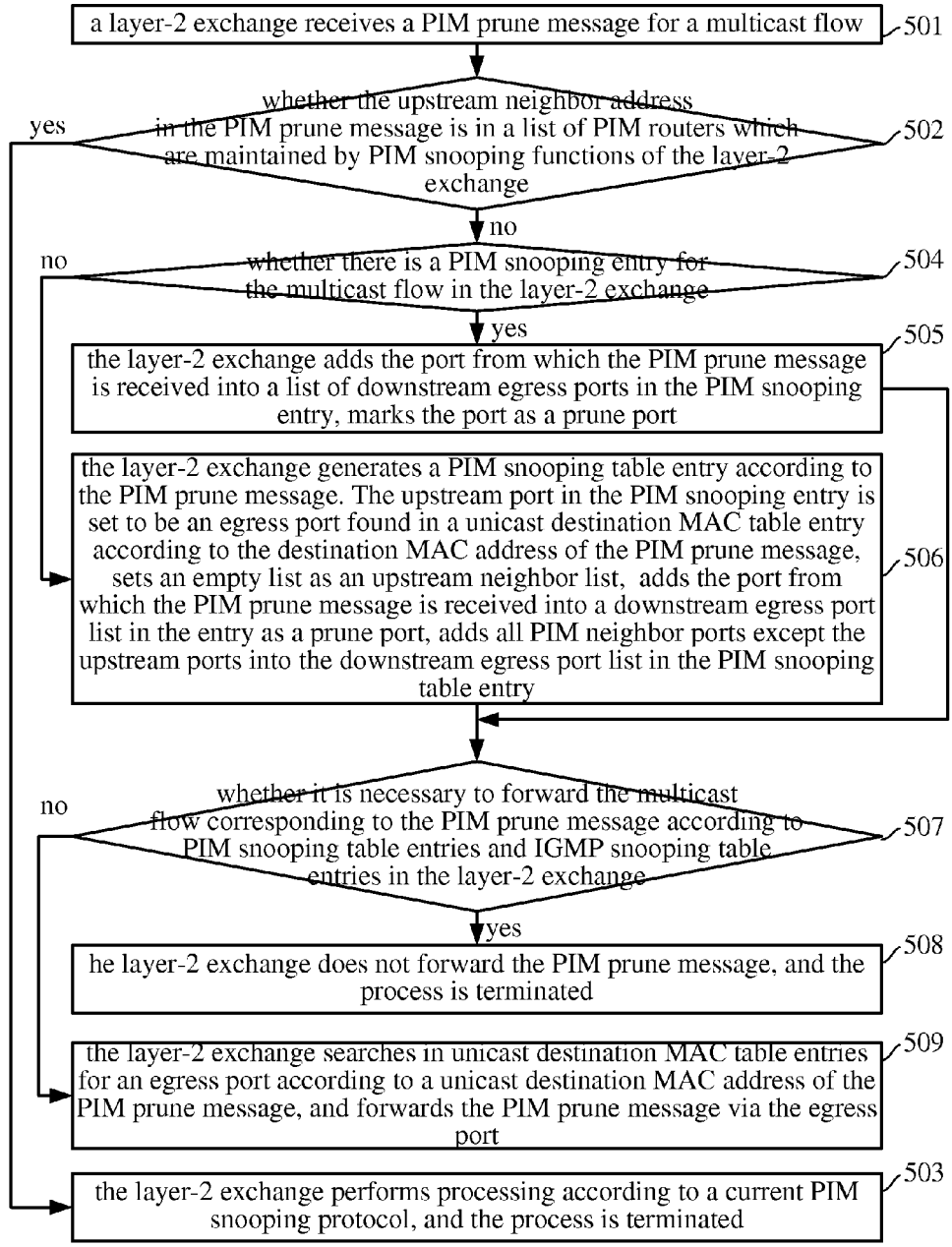
FIG. 5 is a flowchart illustrating a process performed by a layer-2 exchange after receiving a PIM prune message according to an example.

The PIM prune message sent by the first hop PIM router will reach the one or multiple layer-2 exchanges between the multicast source and the first hop PIM router. FIG. 5 is a flowchart illustrating a process performed by a layer-2 exchange after receiving a PIM prune message according to an example. As shown in FIG. 5, the process may include the following operations.

At block 501, a layer-2 exchange receives a PIM prune message for a multicast flow.

At block 502, the layer-2 exchange determines whether the upstream neighbor address in the PIM prune message is in a list of PIM routers that are maintained by PIM snooping functions of the layer-2 exchange, performs operations at block 503 if the upstream neighbor address is in the list, or performs operations at block 504 if the upstream neighbor address is not in the list.

At block 503, the layer-2 exchange performs processing according to a current PIM snooping protocol, and the process is terminated.

If the upstream neighbor address in the PIM prune message is in the list of PIM routers maintained by PIM snooping functions, which is an indication that the layer-2 exchange is deployed between PIM routers, the processing according to current PIM snooping protocol is performed. Otherwise, this is an indication that the layer-2 exchange is deployed between the multicast source and the first hop PIM router, thus the processing according to an example is adopted, i.e., operations at blocks 504 to 509.

At block 504, the layer-2 exchange determines whether there is a PIM snooping entry for the multicast flow in the layer-2 exchange, performs operations at block 505 when there is the PIM snooping entry, or performs operations at block 506 when there is no such PIM snooping entry.

At block 505, the layer-2 exchange adds the port from which the PIM prune message is received into a list of downstream egress ports in the PIM snooping entry, marks the port as a prune port, and performs operations at block 507.

At block 506, the layer-2 exchange generates a PIM snooping table entry according to the PIM prune message. The upstream port in the PIM snooping entry is set to be an egress port found in a unicast destination MAC table entry according to the destination MAC address of the PIM prune message. The upstream neighbor list is empty. The port from which the PIM prune message is received is added into a downstream egress port list in the entry, and is marked as a prune port. All PIM neighbor ports except the upstream ports are added into the downstream egress port list in the PIM snooping table entry.

As for an arbitrary multicast flow, if a PIM snooping table entry has not been established for the multicast flow, the layer-2 exchange forwards the multicast flow via all PIM neighbor ports except upstream ports by default. Therefore, at this block, after a PIM snooping table entry is established for the multicast flow, all PIM neighbor ports except the upstream ports and marked prune ports are added into the downstream egress port list of the PIM snooping table entry in order to guarantee that the multicast flow will be forwarded to all PIM neighbor ports except the upstream ports when the multicast flow is subsequently received.

At block 507, the layer-2 exchange determines whether it is necessary to forward the multicast flow corresponding to the PIM prune message according to PIM snooping table entries and IGMP snooping table entries in the layer-2 exchange, i.e., determining whether there is a PIM snooping table entry or an IGMP snooping table entry having a port whose role of the highest priority is membership port or router port, and performs operations at block 508 if there is, or performing operations at block 509 if there is not.

At block 508, the layer-2 exchange does not forward the PIM prune message, and the process is terminated.

At block 509, the layer-2 exchange searches in unicast destination MAC table entries for an egress port according to a unicast destination MAC address of the PIM prune message, and forwards the PIM prune message via the egress port.

The PIM prune message then reaches the multicast source.

In this example, a lifetime value may be set for a prune port in a PIM snooping table entry. The lifetime value of a prune port may be ⅓ of the lifetime value of the (S,G) entry of the multicast flow in the PIM router, e.g., one minute by default. Therefore, a PIM DR may receive the multicast flow every one minute. When the lifetime value of prune ports expires, all the prune ports in a PIM snooping entry may temporarily be set as router ports to have the multicast flow forwarded through the ports. If no PIM prune message for the multicast flow is received from a port within a pre-defined time period from the time the lifetime value of the prune port expires, the port is formally set as a router port. Then, a determination as to whether there are other prune ports in the PIM snooping table entry is made, and the PIM snooping table entry is deleted if there are no other prune ports to save entry resources. If any PIM prune message for the multicast flow is received from the port within the pre-defined time period from the time the lifetime value expires, the port is set as a prune port, and the lifetime value of the prune port is reset.

Subsequently, if a device subscribes to a multicast flow whose branch has been pruned off, a branch may be grafted to the multicast flow. A branch should be grafted between a multicast source and a first hop PIM router for a multicast flow that satisfies any of the following three conditions:

1. when a client connected to a downstream PIM router subscribes to the multicast flow, the client may send an IGMP join message to the downstream PIM router, and the downstream PIM router may send a PIM join message to the first hop PIM router after receiving the IGMP join message;

2. when a client connected to the layer-2 exchange subscribes to the multicast flow, the client may send an IGMP join message to the layer-2 exchange;

3. when a client connected to the first hop PIM router subscribes to the multicast flow, the client may send an IGMP join message to the first hop PIM router.

A few exemplary processing procedures in connection with grafting a branch for a multicast flow will be described hereinafter.

Figure 6:
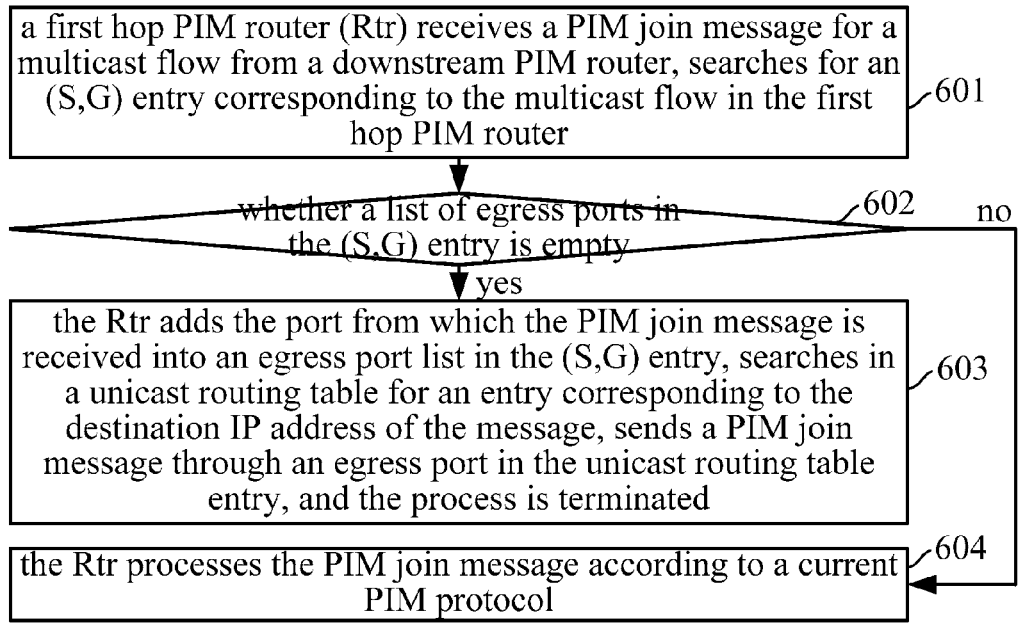
FIG. 6 is a flowchart illustrating a process performed by a first hop PIM router adopting PIM-SSM after receiving a PIM join message from a downstream PIM router according to an example.

FIG. 6 is a flowchart illustrating a process performed by a first hop PIM router adopting PIM-SSM after receiving a PIM join message from a downstream PIM router according to an example. As shown in FIG. 6, the process may include the following operations.

At block 601, a first hop PIM router (Rtr) receives a PIM join message for a multicast flow from a downstream PIM router, searches for an (S,G) entry corresponding to the multicast flow in the first hop PIM router.

When the downstream PIM router of the first hop PIM router is connected to a client, and as shown in FIG. 1, PIM router 2 is a first hop PIM router, PIM router 1 is a downstream PIM router of PIM router 2 and PIM router 1 is connected to client 1. When the client subscribes to a multicast flow, the client may send an IGMP join message for the multicast flow to the downstream PIM router. The downstream PIM router may send a PIM join message for the multicast flow to the first hop PIM router, e.g., the PIM router 2, after receiving the IGMP join message.

At block 602, the Rtr determines whether a list of egress ports in the (S,G) entry is empty, performs operations at block 603 when the list is empty, or performs operations at block 604 when the list is not empty.

At block 603, the Rtr adds the port from which the PIM join message is received into an egress port list in the (S,G) entry, searches in a unicast routing table for an entry corresponding to the destination IP address of the message, sends a PIM join message through an egress port in the unicast routing table entry, and then the process is terminated.

Figure 9:
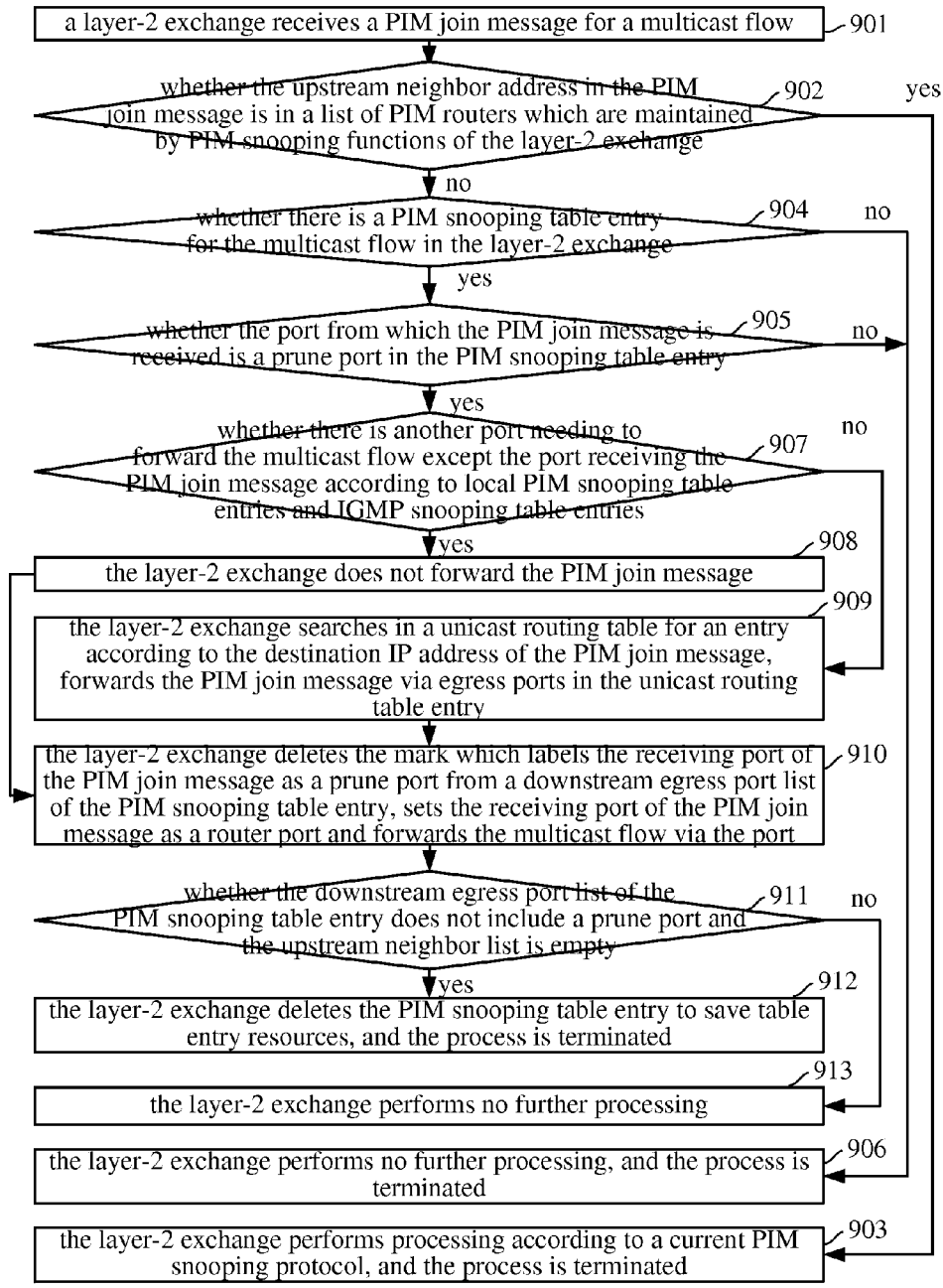
FIG. 9 is a flowchart illustrating a process performed by a layer-2 exchange after receiving a PIM join message according to an example.

The destination IP address of the PIM join message is the IP address of the multicast source, the destination MAC address being the MAC address of the multicast source. The PIM join message may be forwarded to the multicast source through one or more layer-2 exchanges between the Rtr and the multicast source. The processing procedures of the PIM join message by a layer-2 exchange may be as shown in FIG. 9.

To avoid PIM join message loss and to receive the multicast flow quickly, the Rtr may send the PIM join message at a high frequency until the multicast flow is received.

At block 604, the Rtr processes the PIM join message according to a current PIM protocol.

Figure 7:
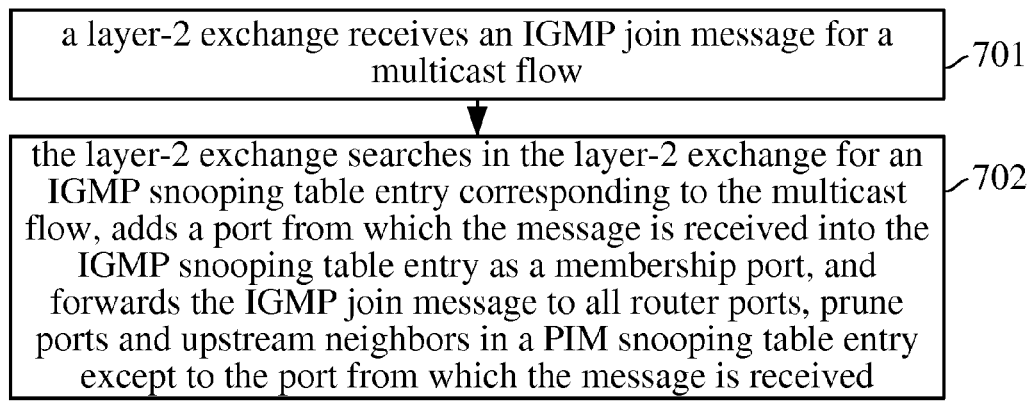
FIG. 7 is a flowchart illustrating a process performed by a layer-2 exchange after receiving a PIM join message according to an example.

FIG. 7 is a flowchart illustrating a process performed by a layer-2 exchange after receiving an IGMP join message according to an example. As shown in FIG. 5, the process may include the following operations.

At block 701, a layer-2 exchange receives an IGMP join message for a multicast flow.

The IGMP join message is initiated by a client connected to the layer-2 exchange.

At block 702, the layer-2 exchange searches in the layer-2 exchange for an IGMP snooping table entry corresponding to the multicast flow, adds a port from which the message is received into the IGMP snooping table entry as a membership port, and forwards the IGMP join message to all router ports, prune ports and upstream neighbors in a PIM snooping table entry except to the port from which the message is received.

The IGMP join message may reach other layer-2 exchanges or the first hop PIM router. A processing procedure of the IGMP join message by the other layer-2 exchanges is the same as that in this example. An example of a processing procedure of the IGMP join message by the first hop PIM router is as shown in FIG. 8.

Figure 8:
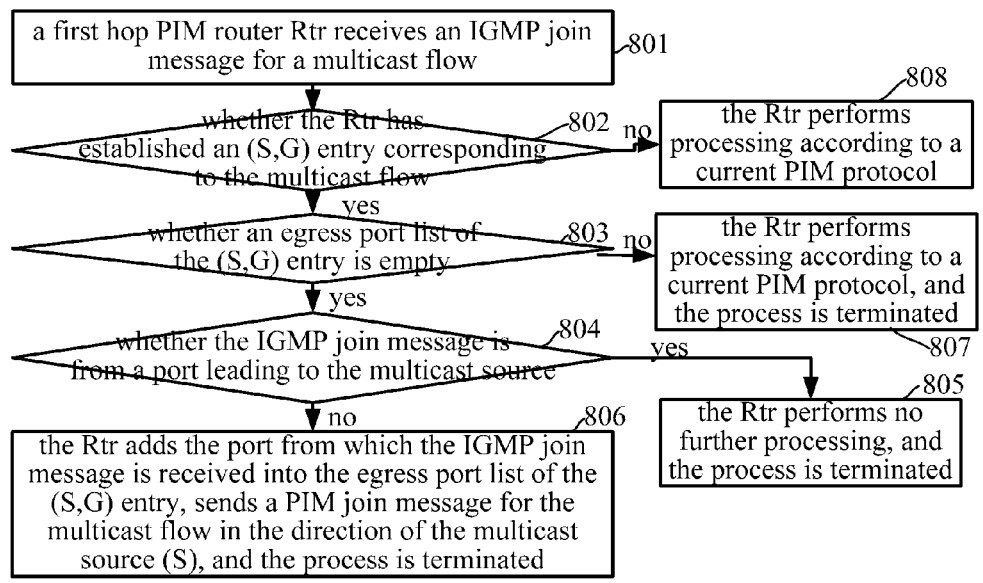
FIG. 8 is a flowchart illustrating a process performed by a first hop PIM router adopting PIM-SSM after receiving an IGMP join message according to an example.

FIG. 8 is a flowchart illustrating a process performed by a first hop PIM router adopting PIM-SSM after receiving an IGMP join message according to an example. As shown in FIG. 8, the process may include the following operations.

At block 801, a first hop PIM router (Rtr) receives an IGMP join message for a multicast flow.

The IGMP join message may be initiated from the following two types of sources.

Source 1: when the first hop PIM router is connected to a client, as shown in FIG. 1, PIM router 2 is the first hop PIM router and is connected to client 2. If the client subscribes to a multicast flow, the client may send an IGMP join message to the first hop PIM router.

Source 2: when a layer-2 exchange between the multicast source and the first hop PIM router is connected to a client, as shown in FIG. 1 where PIM router 2 is the first hop PIM router, and layer-2 exchange 1 between PIM router 2 and multicast sources 1 and 2 is connected to client 3. If client 3 subscribes to a multicast flow, client 3 may send an IGMP join message to layer-2 exchange 1. Layer-2 exchange 1 may forward the IGMP join message to the first hop PIM router.

At block 802, the Rtr determines whether the Rtr has established an (S,G) entry corresponding to the multicast flow, and performs operations at block 803 when the entry has been established, or performs operations at block 808 when the entry has not been established.

At block 803, the Rtr determines whether an egress port list of the (S,G) entry is empty, performs operations at block 804 when the list is empty, or performs operations at block 807 when the list is not empty.

At block 804, the Rtr determines whether the IGMP join message is from a port leading to the multicast source, and performs operations at block 805 if the IGMP join message is from the port, or performs operations at block 806 if the IGMP join message is not from the port.

The IGMP join message is from a port leading to the multicast source, i.e., the source of the IGMP join message is the Source 2 at block 801, thus there is no need to add the port receiving the IGMP join message into the egress port list of the (S,G) entry, nor to send a PIM join message.

At block 805, the Rtr performs no further processing, and the process is terminated.

At block 806, the Rtr adds the port from which the IGMP join message is received into the egress port list of the (S,G) entry, sends a PIM join message for the multicast flow in the direction of the multicast source (S), and the process is terminated.

The destination IP address of the PIM join message is the IP address of the multicast source, the destination MAC address being the MAC address of the multicast source. The PIM join message may be forwarded to the multicast source through layer-2 exchanges between the Rtr and the multicast source. The processing procedures of the PIM join message by a layer-2 exchange may be as shown in FIG. 9.

To avoid PIM join message loss and to receive the multicast flow quickly, the Rtr may send the PIM join message at a high frequency until the multicast flow is received.

At block 807, the Rtr performs processing according to a current PIM protocol, and the process is terminated.

According to a current PIM protocol, the Rtr may add the port from which the IGMP join message is received into the egress port list of the (S,G) entry.

At block 808, the Rtr performs processing according to a current PIM protocol.

According to a current PIM protocol, the Rtr may establish an (S,G) entry corresponding to the multicast flow, and may add the port receiving the IGMP join message into the egress port list of the (S,G) entry.

FIG. 9 is a flowchart illustrating a process performed by a layer-2 exchange after receiving a PIM join message according to an example. As shown in FIG. 9, the process may include the following operations.

At block 901, a layer-2 exchange receives a PIM join message for a multicast flow.

At block 902, the layer-2 exchange determines whether the upstream neighbor address in the PIM join message is in a list of PIM routers which are maintained by PIM snooping functions of the layer-2 exchange, performs operations at block 903 if the upstream neighbor address is in the list, or performs operations at block 904 if the upstream neighbor address is not in the list.

At block 903, the layer-2 exchange performs processing according to a current PIM snooping protocol, and then the process is terminated.

At block 904, the layer-2 exchange determines whether there is a PIM snooping table entry for the multicast flow in the layer-2 exchange, performs operations at block 905 when a PIM snooping table entry exists, or performs operations at block 906 when no such PIM snooping table entry exists.

At block 905, the layer-2 exchange determines whether the port from which the PIM join message is received is a prune port in the PIM snooping table entry, and performs operations at block 907 when the port is a prune port, or performs operations at block 906 when the port is not a prune port.

At block 906, the layer-2 exchange performs no further processing, and the process is terminated.

At block 907, the layer-2 exchange determines whether there is another port needing to forward the multicast flow except the port receiving the PIM join message according to local PIM snooping table entries and IGMP snooping table entries, and performs operations at block 908 when such a port exists, or performs operations at block 909 when such a port does not exist.

At block 908, the layer-2 exchange does not forward the PIM join message, and performs operations at block 910.

At block 909, the layer-2 exchange searches in a unicast routing table for an entry according to the destination IP address of the PIM join message, forwards the PIM join message via egress ports in the unicast routing table entry, and performs operations at block 910.

At block 910, the layer-2 exchange deletes the mark which labels the receiving port of the PIM join message as a prune port from a downstream egress port list of the PIM snooping table entry, sets the receiving port of the PIM join message as a router port and forwards the multicast flow via the port.

At block 911, the layer-2 exchange judges whether the downstream egress port list of the PIM snooping table entry does not include a prune port and the upstream neighbor list is empty, performs operations at block 912 if the downstream egress port list of the PIM snooping table entry does not include a prune port and the upstream neighbor list is empty; otherwise, performs operations at block 913.

At block 912, the layer-2 exchange deletes the PIM snooping table entry to save table entry resources, and the process is terminated.

At block 913, the layer-2 exchange performs no further processing.

Figure 10:
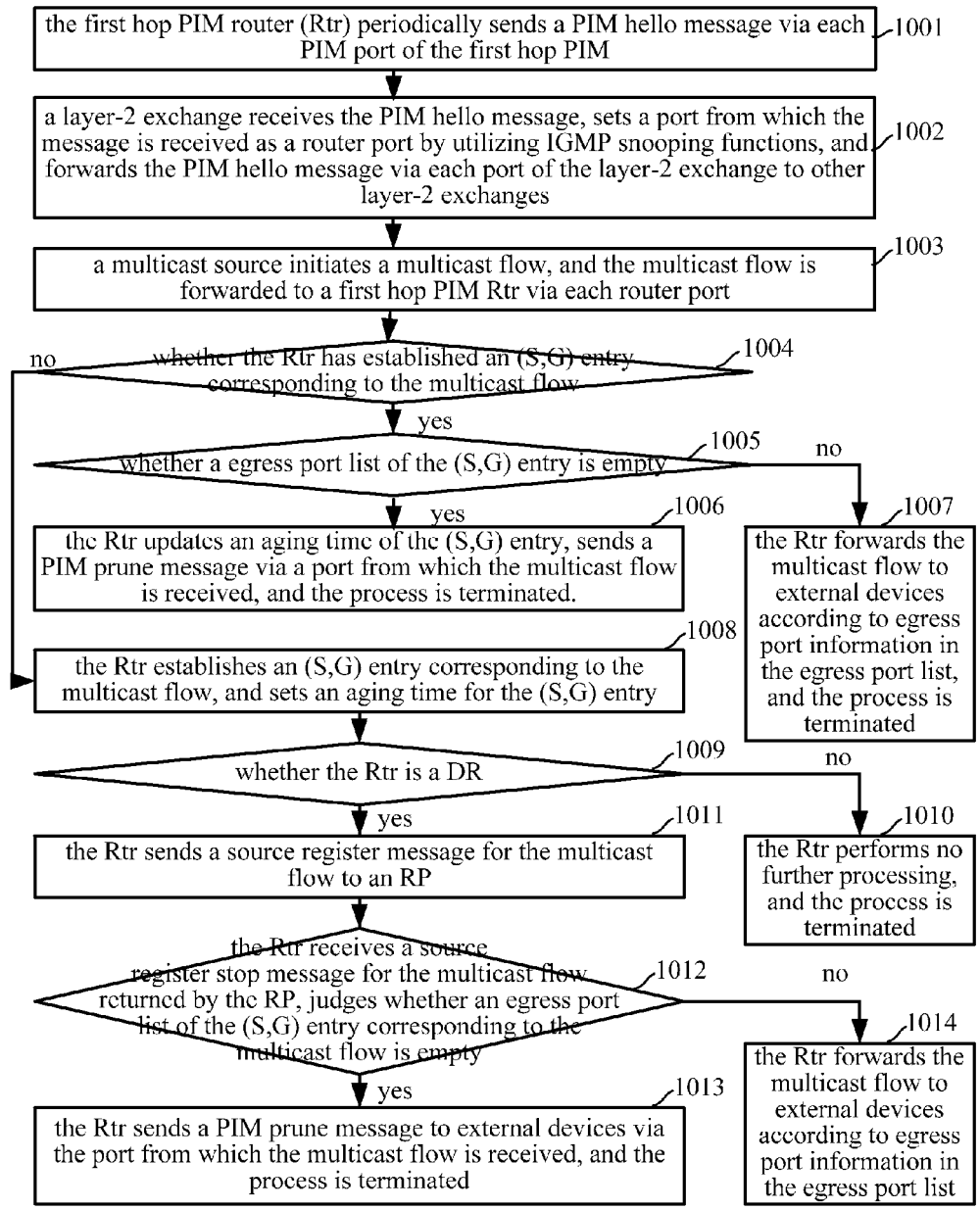
FIG. 10 is a flowchart illustrating a process performed by a first hop PIM router adopting PIM-SM after receiving a multicast flow according to an example.

FIG. 10 is a flowchart illustrating a process performed by a first hop PIM router adopting PIM-SM after receiving a multicast flow according to an example. As shown in FIG. 10, the process may include the following operations.

At block 1001, the first hop PIM router (Rtr) periodically sends a PIM hello message via each PIM port of the first hop PIM.

At block 1002, a layer-2 exchange receives the PIM hello message, sets a port from which the message is received as a router port by utilizing IGMP snooping functions, and forwards the PIM hello message via each port of the layer-2 exchange to other layer-2 exchanges.

Other layer-2 exchanges may also perform the operations at block 1002 after receiving the PIM hello message.

At block 1003, a multicast source initiates a multicast flow, and the multicast flow is forwarded to a first hop PIM Rtr via each router port.

At block 1004, the Rtr judges whether the Rtr has established an (S,G) entry corresponding to the multicast flow, and performs operations at block 1005 when the entry has been established, or performs operations at block 1008 when the entry has not been established.

At block 1005, the Rtr judges whether an egress port list of the (S,G) entry is empty, performs operations at block 1006 when the list is empty, or performs operations at block 1007 when the list is not empty.

At block 1006, the Rtr updates an aging time of the (S,G) entry, sends a PIM prune message via a port from which the multicast flow is received, and the process is terminated.

The upstream neighbor address of the PIM prune message is the IP address of the multicast source, the destination IP address is the IP address of the multicast source and the destination MAC address is the MAC address of the multicast source.

Since the PIM prune message is sent from the port via which the multicast flow enters the Rtr, the PIM prune message will reach the layer-2 exchange between the multicast source and the Rtr. The layer-2 exchange may perform the processing procedures shown in FIG. 5 after receiving the PIM prune message.

At block 1007, the Rtr forwards the multicast flow to external devices according to egress port information in the egress port list, and the process is terminated.

At block 1008, the Rtr establishes an (S,G) entry corresponding to the multicast flow, and sets an aging time for the (S,G) entry.

The aging time of the (S,G) entry is generally configured as three minutes.

At block 1009, the Rtr determines whether the Rtr is a DR, and performs operations at block 1011 when the Rtr is a DR, or performs operations at block 1010 when the Rtr is not a DR.

At block 1010, the Rtr performs no further processing, and the process is terminated.

At block 1011, the Rtr sends a source register message for the multicast flow to an RP.

At block 1012, the Rtr receives a source register stop message for the multicast flow returned by the RP, determines whether an egress port list of the (S,G) entry corresponding to the multicast flow is empty, and performs operations at block 1013 when the list is empty, or performs operations at block 1014 when the list is not empty.

After receiving the source register message for the multicast flow, the RP may first return a PIM join message for the multicast flow to the Rtr when determining there is a receiver of the multicast flow, and sends a source register stop message for the multicast flow to the Rtr. After receiving the PIM join message, the Rtr adds the port from which the message is received into an egress port list of an (S,G) entry corresponding to the multicast flow. The RP may directly return a source register stop message for the multicast flow to the Rtr.

At block 1013, the Rtr sends a PIM prune message to external devices via the port from which the multicast flow is received, and the process is terminated.

The upstream neighbor address of the PIM prune message is the IP address of the multicast source, the destination IP address is the IP address of the multicast source and the destination MAC address is the MAC address of the multicast source.

Since the PIM prune message is sent from the port via which the multicast flow enters the Rtr, the PIM prune message will reach the one or multiple layer-2 exchanges between the multicast source and the Rtr. The layer-2 exchange may perform the processing procedures shown in FIG. 5 after receiving the PIM prune message.

At block 1014, the Rtr forwards the multicast flow to external devices according to egress port information in the egress port list.

When the first hop PIM router adopts bi-directional PIM and is not a DR, the processing procedures of the multicast flow by the first hop PIM router are the same as that of a first hop PIM router that adopts PIM-SM and is not a DR when receiving a multicast flow.

In addition, the first hop PIM router adopts PIM-SM or bi-directional PIM, and the first hop PIM router may send a PIM join message in the direction of the multicast source for each (S,G) entry established in the first hop PIM router when the first hop PIM router becomes a DR from a non-DR.

After the first hop PIM router adopting the PIM-SM receives a PIM prune message from a downstream PIM router or an IGMP leave message from a client connected to the first hop PIM router, the processing procedures of the first hop PIM router are the same with that of a first hop PIM router adopting PIM-SSM, as in the example shown in FIG. 4.

After the first hop PIM router adopting the PIM-SM receives a PIM join message from a downstream PIM router, the processing procedures of the first hop PIM router are the same as that of a first hop PIM router adopting PIM-SSM, as in the example shown in FIG. 6.

After the first hop PIM router adopting the PIM-SM receives an IGMP join message from a downstream PIM router, the processing procedures of the first hop PIM router are the same as that of a first hop PIM router adopting PIM-SSM, as in the example shown in FIG. 8.

Figure 11:
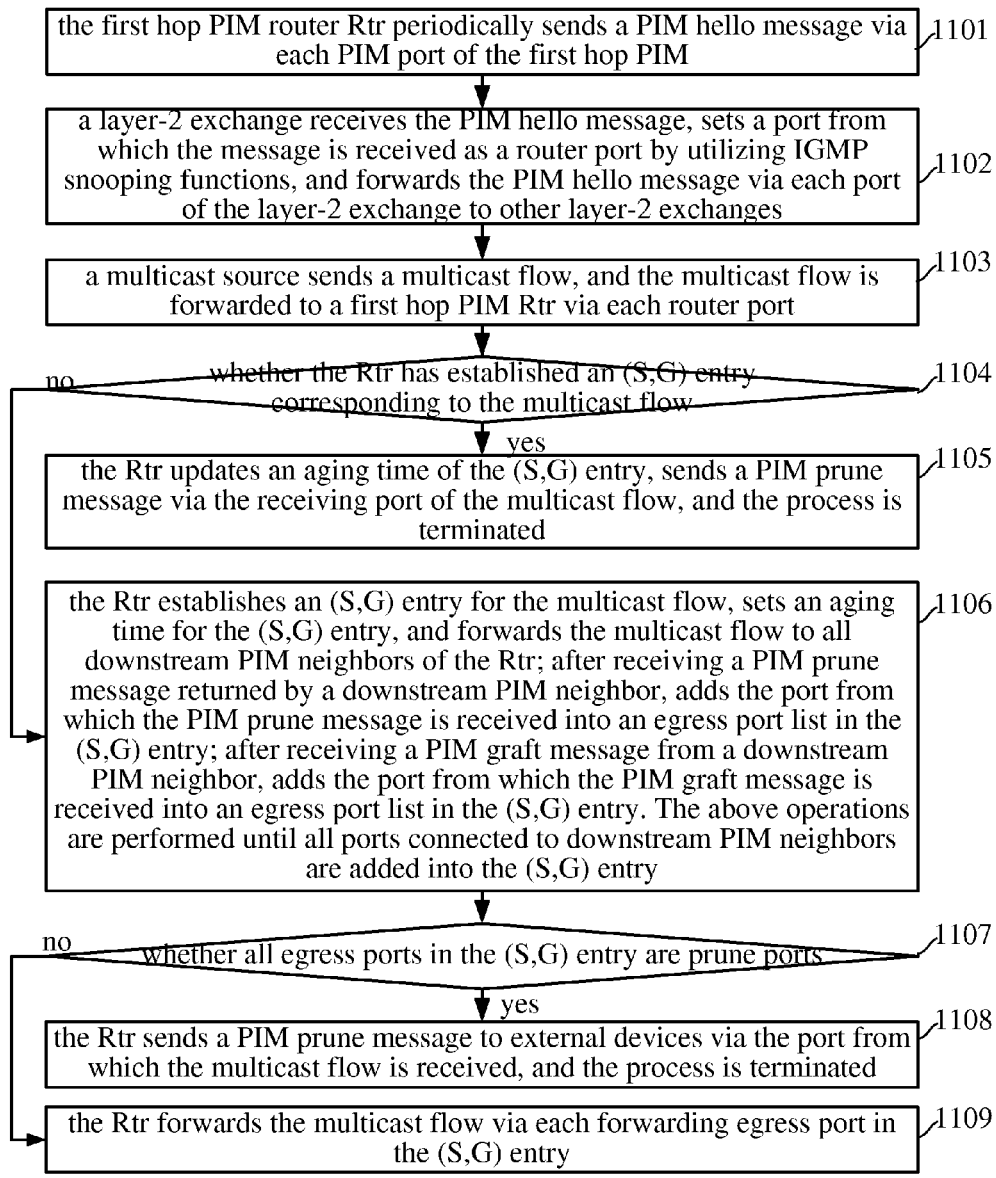
FIG. 11 is a flowchart illustrating a process performed by a first hop PIM router adopting PIM-DM after receiving a multicast flow according to an example.

FIG. 11 is a flowchart illustrating a process performed by a first hop PIM router adopting PIM-DM after receiving a multicast flow according to an example. As shown in FIG. 11, the process may include the following operations.

At block 1101, the first hop PIM router (Rtr) periodically sends a PIM hello message via each PIM port of the first hop PIM.

At block 1102, a layer-2 exchange receives the PIM hello message, sets a port from which the message is received as a router port by utilizing IGMP snooping functions, and forwards the PIM hello message via each port of the layer-2 exchange to other layer-2 exchanges.

Other layer-2 exchanges may also perform the operations at block 1102 after receiving the PIM hello message.

At block 1103, a multicast source sends a multicast flow, and the multicast flow is forwarded to a first hop PIM Rtr via each router port.

At block 1104, the Rtr judges whether the Rtr has established an (S,G) entry corresponding to the multicast flow, and performs operations at block 1105 when the entry has been established, or performs operations at block 1106 when the entry has not been established.

At block 1105, the Rtr updates an aging time of the (S,G) entry, and operations at block 1107 are performed.

At block 1106, the Rtr establishes an (S,G) entry for the multicast flow, sets an aging time for the (S,G) entry, and forwards the multicast flow to all downstream PIM neighbors of the Rtr; after receiving a PIM prune message returned by a downstream PIM neighbor, adds the port from which the PIM prune message is received into an egress port list in the (S,G) entry as a prune port; after receiving a PIM graft message from a downstream PIM neighbor, adds the port from which the PIM graft message is received into an egress port list in the (S,G) entry as a forwarding port. The above operations are performed until all of the ports connected to downstream PIM neighbors are added into the (S,G) entry.

The aging time of the (S,G) entry is generally configured as three minutes.

At block 1107, the Rtr judges whether all egress ports in the (S,G) entry are prune ports, performs operations at block 1108 when all egress ports are prune ports, or performs operations at block 1109 when all egress ports are not prune ports.

At block 1108, the Rtr sends a PIM prune message to external devices via the port from which the multicast flow is received, and the process is terminated.

The upstream neighbor address of the PIM prune message is the IP address of the multicast source, the destination IP address is the IP address of the multicast source and the destination MAC address is the MAC address of the multicast source.

Since the PIM prune message is sent from the port via which the multicast flow enters the Rtr, the PIM prune message will reach the one or multiple layer-2 exchanges between the multicast source and the Rtr. The layer-2 exchange may perform the processing procedures shown in FIG. 5 after receiving the PIM prune message.

At block 1109, the Rtr forwards the multicast flow via each forwarding egress port in the (S,G) entry.

Figure 12:
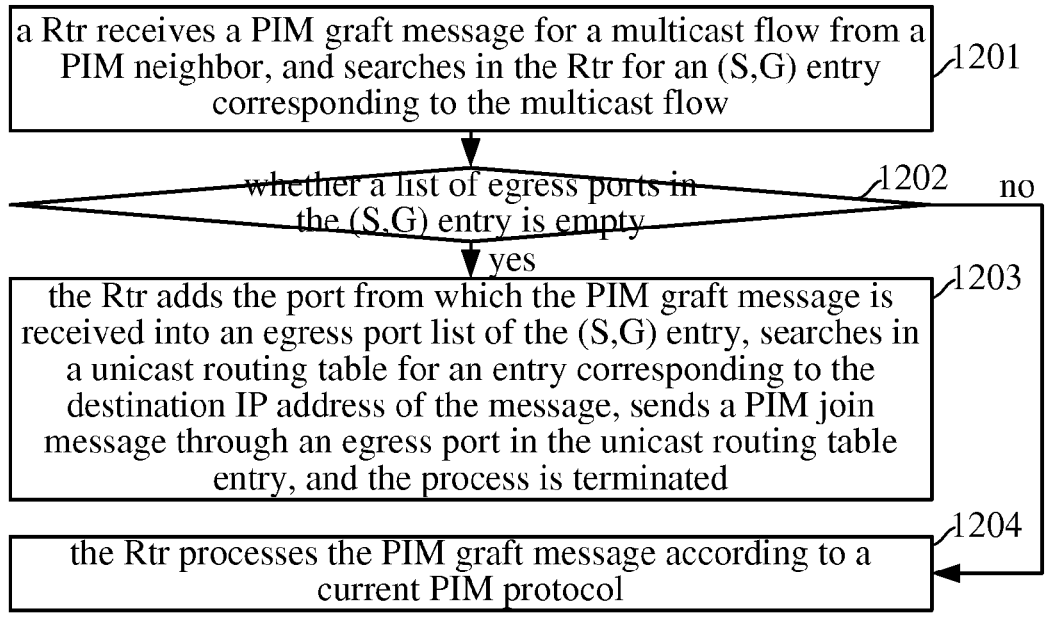
FIG. 12 is a flowchart illustrating a process performed by a first hop PIM router adopting PIM-DM after receiving a PIM graft message from a PIM neighbor according to an example.

FIG. 12 is a flowchart illustrating a process performed by a first hop PIM router adopting PIM-DM after receiving a PIM graft message from a PIM neighbor according to an example. As shown in FIG. 12, the process may include the following operations.

At block 1201, a Rtr receives a PIM graft message for a multicast flow from a PIM neighbor, and searches in the Rtr for an (S,G) entry corresponding to the multicast flow.

At block 1202, the Rtr judges whether a list of egress ports in the (S,G) entry is empty, performs operations at block 1203 when the list is empty, or performs operations at block 1204 when the list is not empty.

At block 1203, the Rtr adds the port from which the PIM graft message is received into an egress port list of the (S,G) entry, searches in a unicast routing table for an entry corresponding to the destination IP address of the message, sends a PIM join message through an egress port in the unicast routing table entry, and the process is terminated.

The destination IP address of the PIM join message is the IP address of the multicast source and the destination MAC address is the MAC address of the multicast source. The PIM join message may be forwarded to the multicast source through layer-2 exchanges between the Rtr and the multicast source. The processing procedures of the PIM join message by a layer-2 exchange may be as shown in FIG. 9.

To avoid PIM join message loss and to receive the multicast flow quickly, the Rtr may send the PIM join message at a high frequency until the multicast flow is received.

At block 1204, the Rtr processes the PIM graft message according to a current PIM protocol.

After the first hop PIM router adopting the PIM-DM receives a PIM prune message from a downstream PIM router or an IGMP leave message from a client connected to the first hop PIM router, the processing procedures of the first hop PIM router are the same as those of a first hop PIM router adopting PIM-SSM, as in the example shown in FIG. 4.

After the first hop PIM router adopting the PIM-DM receives an IGMP join message from a downstream PIM router, the processing procedures of the first hop PIM router are the same as those of a first hop PIM router adopting PIM-SSM, as in the example shown in FIG. 8.

Figure 13:
FIG. 13 is a schematic diagram illustrating a structure of a PIM router according to an example.

FIG. 13 is a schematic illustrating a structure of a PIM router provided by an example. The PIM router is a first hop PIM router, is connected to a multicast source via a layer-2 exchange having PIM snooping functions. As shown in FIG. 13, the PIM router may include: a first module and a second module.

The first module is to receive a multicast flow initiated from the multicast source, to delete the port from which a PIM prune message or a multicast group leave message is received from an egress port list of the multicast flow after receiving the PIM prune message from a downstream PIM router for the multicast flow or after receiving the multicast group leave message from a client connected to the PIM router, to determine whether the multicast flow is to be received, and to send a prune indication to the second module in response to a determination that the multicast flow is not to be received.

The multicast group leave message is an IGMP leave message or an MLD leave message.

The second module is to receive the prune indication, and to send a PIM prune message via the port from which the multicast flow is received.

When the PIM router adopts PIM-SSM, or is not a DR and adopts PIM-SM, the first module may include the following sub modules.

A first sub module is to receive the multicast flow and send information of the multicast flow to a second sub module.

The second sub module is to receive the information of the multicast flow from the first sub module, to determine that the multicast flow is not to be received and to send the prune indication to the second module when a determination that a multicast routing table entry has not been established for the multicast flow in the PIM router is made or when a determination that a multicast routing table entry has been established for the multicast flow but an egress port list of the multicast routing table entry is empty is made.

When the PIM router adopts PIM-SM and is DR, the first module may include the following sub modules.

A first sub module is to receive the multicast flow and send information of the multicast flow to a second sub module.

The second sub module is to receive the information of the multicast flow from the first sub module, to determine that the multicast flow is not to be received and to send the prune indication to the second module when a determination that a multicast routing table entry has been established for the multicast flow but an egress port list of the multicast routing table entry is empty is made; or to establish a multicast routing table entry for the multicast flow and to send a source register message to an RP when a determination that a multicast routing table entry has not been established for the multicast flow is made, to determine that the multicast flow is not to be received and to send the prune indication to the second module after receiving a source register stop message from the RP and determining that an egress port list of the multicast routing table entry is empty.

When the PIM router adopts PIM-DM, the first module may include the following sub modules.

A first sub module is to receive the multicast flow and send information of the multicast flow to a second sub module.

The second sub module is to receive the information of the multicast flow from the first sub module, to determine that the multicast flow is not to be received and to send the prune indication to the second module when determining a multicast routing table entry has been established for the multicast flow but all egress ports in the multicast routing table entry are prune ports; or to establish a multicast routing table entry for the multicast flow and to forward the multicast flow to all downstream PIM neighbors when a determination that a multicast routing table entry has not been established for the multicast flow is made; to receive a PIM prune message from a downstream PIM neighbor and to add the port from which the PIM graft message is received into an egress port list of the multicast routing table entry as a prune port; to receive a PIM graft message from a downstream PIM neighbor and to add the port from which the PIM graft message is received into an egress port list of the multicast routing table entry as a forwarding port; to determine that the multicast flow is not to be received and to send the prune indication to the second module after determining that all ports connected to the downstream PIM neighbors have been added into the egress port list of the multicast routing table list and that all egress ports in the multicast routing table entry are prune ports.

In practice, when the PIM router adopts PIM-SM or PIM-SSM, the first module may also include: a third module, to receive a PIM join message for the multicast flow from a downstream PIM router or a multicast group join message from a client connected to the PIM router, and to send a PIM join message in the direction of the multicast source.

The third module is further to determine whether a multicast routing table entry corresponding to the multicast flow has been established in the PIM router after receiving a PIM join message for the multicast flow from a downstream PIM router, to add the port from which the PIM join message is received into an egress port list of the multicast routing table entry and to send a PIM join message in the direction of the multicast source when a determination that the egress port list of the multicast routing table entry is empty is made.

In practice, when the PIM router adopts PIM-SM or PIM-SSM or PIM-DM, the PIM router may also include: a fourth module, to receive a multicast group join message for the multicast flow from a client connected to the PIM router, and to send a PIM join message in the direction of the multicast source.

The fourth module is further to determine whether a multicast routing table entry corresponding to the multicast flow has been established in the PIM router after receiving a multicast group join message for the multicast flow from a client connected to the PIM router, to add the port from which the multicast group join message is received into an egress port list of the multicast routing table entry and to send a PIM join message in the direction of the multicast source when a determination that the multicast routing table entry has been established and the egress port list of the multicast routing table entry is empty is made.

When the PIM router adopts PIM-SM and is not a DR, or adopts bi-directional PIM and is not a DR, the PIM router may also include: a fifth module, to send, for a multicast routing table entry established for each multicast flow, a PIM join message for the multicast flow in the direction of the multicast source when the PIM router was not a DR and becomes a DR.

When the PIM router adopts PIM-DM, the PIM router may also include: a sixth module, to receive a PIM graft message for the multicast flow from a downstream PIM neighbor, and to send a PIM join message in the direction of the multicast source.

The sixth module is further to judge whether a multicast routing table entry corresponding to the multicast flow has been established in the PIM router after receiving a PIM graft message for the multicast flow from a downstream PIM neighbor, to add the port from which the PIM graft message is received into an egress port list of the multicast routing table entry and to send a PIM join message in the direction of the multicast source when determining the multicast routing table entry has been established and the egress port list of the multicast routing table entry is empty.

The following is a description of a structure of a exchange with PIM snooping functions according to an example. The exchange is deployed between a multicast source and a first hop PIM router. The exchange may mainly include a first module, a second module and a third module.

The first module is to receive a PIM prune message for a multicast flow, to add a port from which the PIM prune message is received into a PIM snooping entry corresponding to the multicast flow as a prune port and to stop forwarding the multicast via the prune port when a determination that the upstream neighbor address in the message is not in a list of PIM routers which are maintained by PIM snooping functions of the exchange is made.

The first module may further set a prune time for a prune port, and begin forwarding the multicast flow via the prune port when the prune time expires.

The first module may further set a lifetime value that is smaller than the lifetime value of the multicast routing table entry of the multicast flow corresponding to the PIM prune message in the first hop PIM router; set the prune port as a temporary router port when the lifetime value of the prune port expires, and set the temporary router port as a router port if a PIM prune message for the multicast flow is not received within a pre-defined period of time, or set the temporary router port as a prune port and reset the lifetime value of the prune port if a PIM prune message for the multicast flow is received.

After determining the upstream neighbor address in the PIM prune message is not in the list of PIM routers that are maintained using the PIM snooping functions of the exchange, the first module may further establish a PIM snooping entry for the multicast flow when determining a PIM snooping entry has not been established for the multicast flow in the exchange, set an empty list as an upstream neighbor list of the PIM snooping entry, add all PIM neighbor ports except upstream ports of the exchange into an egress port list in the PIM snooping entry, add the prune port into the PIM snooping entry of the multicast flow; determine whether the multicast flow is to be forwarded based on PIM snooping entries and multicast group management entries in the exchange, and not forwarding the PIM prune message if the multicast flow is to be forwarded, or forwarding the PIM prune message in the direction of the multicast source if the multicast flow is not to be forwarded.

After determining the upstream neighbor address in the message is not in the list of PIM routers maintained by the PIM snooping functions, the first module may directly add the prune port into the PIM snooping entry of the multicast flow when determining the PIM snooping entry has been established for the multicast flow; determine whether the multicast flow is to be forwarded based on PIM snooping entries and multicast group management entries in the exchange, and not forwarding the PIM prune message if the multicast flow is to be forwarded, or forwarding the PIM prune message in the direction of the multicast source if the multicast flow is not to be forwarded.

When the layer-2 exchange adopts IGMP, the multicast group snooping entry is an IGMP snooping entry. When the layer-2 exchange adopts MLD, the multicast group snooping entry is an MLD snooping entry.

The second module is to receive a PIM join message for a multicast flow. When a determination that the upstream neighbor address in the message is not in a list of PIM routers that are maintained by PIM snooping functions of the exchange is made, a determination is made as to whether there is another port other than the port from which the PIM join message is received is to receive the multicast flow based on PIM snooping entries and multicast group management snooping entries in the exchange when a determination is made that there is a PIM snooping entry for the multicast flow corresponding to the PIM join message in the exchange and the port receiving the PIM join message is a prune port in the PIM snooping entry, the PIM join message is not forwarded when there is another port requiring receipt of the multicast flow, or the PIM join message is forwarded in the direction of the multicast source if there is no other port requiring receipt of the multicast flow.

The second module may further delete the port receiving the PIM join message from the PIM snooping entry after forwarding the PIM join message in the direction of the multicast source, and set the port as a router port.

The third module is to receive a multicast group management join message for a multicast flow, add the port receiving the message into a multicast group management entry of the multicast flow as a membership port, and forward the multicast group management join message via all router ports, prune ports and upstream neighbors in the PIM snooping entry except the port from which the message is received.

The multicast group management join message may be an IGMP join message or an MLD join message.

Figure 14:
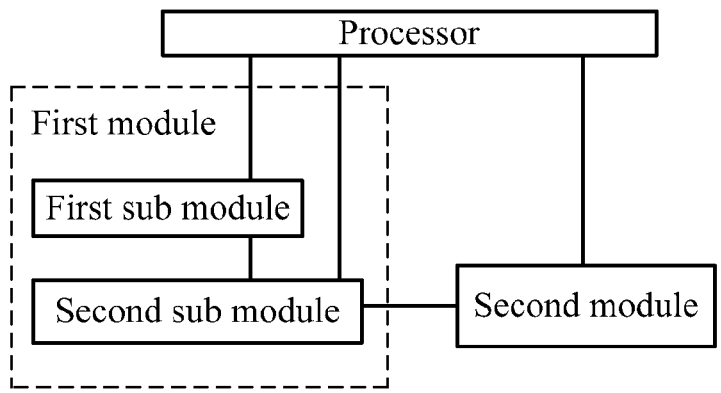
FIG. 14 is a schematic diagram illustrating a structure of a PIM router according to an example.

The example methods, systems and modules disclosed herein may be implemented by hardware, machine-readable instructions or a combination of hardware and machine-readable instructions. Machine-readable instructions used in the examples disclosed herein may be stored in storage medium readable by one or more processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on. For example, FIG. 14 is a schematic diagram illustrating a structure of a PIM router provided by another example. The PIM router is a first hop PIM router, and may be connected to a multicast source via a layer-2 exchange having PIM snooping functions. As shown in FIG. 14, the PIM router may include: a first module, a second module, and a processor. The first module and the second module may be stored in storage medium readable by the processor to cause the processor to perform similar functions as the first module and the second module shown in FIG. 13.

A machine-readable storage medium is also provided, which is to store instructions to cause a machine to execute a control method as disclosed herein. Specifically, a system or apparatus having a storage medium which stores machine-readable instructions which may be read and executed by one or more processors (e.g. a CPU or MPU etc) of the system or apparatus to implement the methods and functions described in the above examples.

In this situation, the machine readable instructions (e.g. program codes) read from the storage medium may implement any one of the above examples, thus the machine readable instructions and the storage medium storing the machine readable instructions are part of the technical scheme.

The storage medium for providing the machine readable instructions may include a floppy disk, hard drive, magnetooptical disk, compact disk (such as CD-ROM, CD-ft CD-RW, DVD-ROM, DVD-RAM, DVD-RW, DVD+RW), magnetic tape drive, Flash card, ROM and so on. Optionally, the machine readable instructions may be downloaded from a server computer via a communication network.

It should be noted that, alternatively to the machine readable instructions being executed by a computer, at least part of the operations performed by the machine readable instructions may be implemented by an operation system running in a computer following instructions based on the machine readable instructions to realize the technical scheme of any of the above examples.

In addition, the machine readable instructions implemented from a storage medium may be written in a storage in an extension board inserted in the computer or in a storage in an extension unit connected to the computer. In this example, a CPU in the extension board or the extension unit executes at least part of the operations according to the instructions based on the machine readable instructions to realize the technical scheme of any of the above examples.

The foregoing are only examples of the present disclosure and are not for use in limiting the protection of scope thereof. All modifications, equivalent replacements or improvements in accordance with the spirit and principles of the present disclosure shall be included in the protection scope of the present disclosure.

What is claimed is:

1. A layer-2 exchange with Protocol Independent Multicast (PIM) snooping functions, for deployment between a multicast source and a first hop PIM router, the layer-2 exchange comprising:
  a processor; and
  a memory storing instructions that when executed by the processor cause the processor to:
    receive a PIM prune message for a multicast flow,
    in response to a determination that an upstream neighbor address in the PIM prune message is not in a list of PIM routers maintained by the PIM snooping functions of the layer-2 exchange, add a port from which the PIM prune message is received into a list of egress ports in a PIM snooping entry corresponding to the multicast flow and mark the port in the list of egress ports as a prune port,
    stop forwarding the multicast flow via the port that is marked as the prune port; and
    set a lifetime value for the prune port smaller than the lifetime value of an entry of the multicast flow corresponding to the PIM prune message in the first hop PIM router; to set the prune port as a temporary router port when the lifetime value of the prune port expires, and to set the temporary router port as a router port if a PIM prune message for the multicast flow is not received within a pre-defined period of time; and to set the temporary router port as a prune port and reset the lifetime value of the prune port if a PIM prune message for the multicast flow is received within the pre-defined time period.

2. The exchange of claim 1, wherein the processor is further to set a prune time for the prune port, and to begin forwarding the multicast flow to the prune port when the prune time expires.

3. The exchange of claim 1, wherein, the processor is further to, in response to a determination that the upstream neighbor address in the PIM prune message is not in a list of PIM routers using PIM snooping functions of the exchange and a PIM snooping entry has not been established for the multicast flow in the exchange, establish a PIM snooping entry for the multicast flow, to set an empty list as an upstream neighbor list in the PIM snooping entry, to add all ports connected to PIM neighbors except upstream ports into a downstream egress port list in the PIM snooping entry, to perform the adding of the prune port into the PIM snooping entry corresponding to the multicast flow; and
  to determine whether the multicast flow corresponding to the PIM prune message is to be forwarded based on PIM snooping entries and multicast group management entries in the layer-2 exchange, forwarding no PIM prune message if the multicast flow corresponding to the PIM prune message is to be forwarded, or forwarding the PIM prune message in the direction of the multicast source if the multicast flow corresponding to the PIM prune message is not to be forwarded.

4. The exchange of claim 1, wherein the processor is further to directly perform the adding of the prune port into the PIM snooping entry corresponding to the multicast flow in response to a determination that an upstream neighbor address in the PIM prune message is not in a list of PIM routers using PIM snooping functions of the exchange and a PIM snooping entry has been established for the multicast flow in the exchange; and
  to determine whether there the multicast flow corresponding to the PIM prune message is to be forwarded based on PIM snooping entries and multicast group management entries in the layer-2 exchange, forwarding no PIM prune message if the multicast flow corresponding to the PIM prune message is to be forwarded, or forwarding the PIM prune message in the direction of the multicast source if the multicast flow corresponding to the PIM prune message is not to be forwarded.

5. The exchange of claim 1, wherein the processor is further to receive a PIM join message for a multicast flow; in response to a determination that the upstream neighbor address in the message is not in a list of PIM routers that are maintained by PIM snooping functions of the exchange, to determine whether there is another port other than the port from which the PIM join message is received is to receive the multicast flow based on PIM snooping entries and multicast group management snooping entries in the exchange in response to a determination that there is a PIM snooping entry for the multicast flow corresponding to the PIM join message in the exchange and the port receiving the PIM join message is a prune port in the PIM snooping entry, to forward no PIM join message when there is another port that is to receive the multicast flow, or to forward the PIM join message in the direction of the multicast source if there is no other port that is to receive the multicast flow.

6. The exchange of claim 5, wherein the processor is further to delete a mark which labels the port from which the PIM join message is received as a prune port and to set the port as a router port, and to delete the PIM snooping entry corresponding to the multicast flow if the downstream egress port list of the PIM snooping entry does not include a prune port and the upstream neighbor list is empty.

7. The exchange of claim 1, wherein the processor is further to receive a multicast group join message for a multicast flow, to add a port from which the multicast group join message is received into a multicast group management snooping entry corresponding to the multicast flow as a membership port, and to forward the multicast group join message to all router ports, prune ports and upstream neighbors in the PIM snooping entry except the port from which the multicast group join message is received.

8. A method for pruning a multicast branch in a network comprising a multicast source connected to a first hop PIM router via at least one layer-2 exchange with Protocol Independent Multicast (PIM) snooping functions, said method comprising:

receiving, by the first hop PIM router, a multicast flow initiated by the multicast source, sending a PIM prune message to the at least one layer-2 exchange via a port from which the multicast flow is received in response to a determination that the multicast flow is not to be received, and setting a lifetime value of an entry of the multicast flow corresponding to the PIM prune message in the first hop PIM router greater than a lifetime value for a prune port of the at least one layer-2 exchange; and receiving, by the first hop PIM router, a PIM prune message for a multicast flow from a downstream PIM router or a multicast group leave message for a multicast flow from a client connected to the first hop PIM router, deleting a port via which the PIM prune message or the multicast group leave message is received from an egress port list corresponding to the multicast flow, and sending a PIM prune message addressed to the multicast source via the port from which the multicast flow is received in response to a determination that the multicast flow is not to be received.

9. The method of claim 8, further comprising:

receiving, by one of the at least one layer-2 exchange, the PIM prune message from the first hop PIM router, adding a port from which the PIM prune message is received into a PIM snooping entry corresponding to the multicast flow, marking the added port as a prune port, and stopping forwarding of the multicast flow via the prune port.

10. A Protocol Independent Multicast (PIM) router, connected to a multicast source via at least one layer-2 exchange, comprising:

a processor; and a memory storing instructions that when executed by the processor cause the processor to receive a multicast flow initiated by the multicast source, to determine whether the multicast flow is to be received, to send a prune indication to the at least one layer-2 exchange in response to a determination that the multicast flow is not to be received, to set a lifetime value of an entry of the multicast flow corresponding to the PIM prune message in the PIM router greater than a lifetime value for a prune port of the at least one layer-2 exchange; and to receive a PIM prune message for the multicast flow from a downstream PIM router or a multicast group leave message for the multicast flow from a client connected to the PIM router, to delete a port via which the PIM prune message or the multicast group leave message is received from an egress port list corresponding to the multicast flow, to determine whether there the multicast flow is to be received, and to send a PIM prune message addressed to the multicast source via the port from which the multicast flow is received.

11. The PIM router of claim 10, wherein when the PIM router adopts PIM-SSM, or adopts PIM-SM and is not a Designated Router (DR), or adopts bi-directional PIM and is not a DR, the instructions cause the processor to:

receive the multicast flow and send information of the multicast flow; and determine that the multicast flow is not to be received and to send the prune indication in response to a determination that a multicast routing table entry has not been established for the multicast flow in the PIM router or in response to a determination that a multicast routing table entry has been established for the multicast flow but an egress port list of the multicast routing table entry is empty.

12. The PIM router of claim 10, wherein when the PIM router adopts PIM-SM and is a DR, the instructions cause the processor to:

receive the multicast flow and send information of the multicast flow; and determine that the multicast flow is not to be received and to send the prune indication in response to a determination that a multicast routing table entry has been established for the multicast flow but an egress port list of the multicast routing table entry is empty; or determine that the multicast flow is not to be received and send the prune indication after receiving a source register stop message from an RP and determining that an egress port list of the multicast routing table entry is empty.

13. The PIM router of claim 10, wherein when the PIM router adopts PIM-DM, the instructions cause the processor:

to receive the multicast flow and send information of the multicast flow; and to determine that the multicast flow is not to be received and to send the prune indication in response to a determination that a multicast routing table entry has been established for the multicast flow but all egress ports in the multicast routing table entry are prune ports; or to receive a PIM prune message from a downstream PIM neighbor and to add the port from which the PIM prune message is received into an egress port list of the multicast routing table entry as a prune port; to receive a PIM graft message from a downstream PIM neighbor and to add the port from which the PIM graft message is received into an egress port list of the multicast routing table entry as a forwarding port; to determine that the multicast flow is not to be received and to send the prune indication after determining that all ports connected to the downstream PIM neighbors have been added into the egress port list of the multicast routing table list and that all egress ports in the multicast routing table entry are prune ports.

14. The PIM router of claim 10, wherein when the PIM router adopts PIM-SM or PIM-SSM, the instructions further cause the processor to:

receive a PIM join message for the multicast flow sent by a downstream PIM router, and send a PIM join message in the direction of the multicast source; or when the PIM router adopts PIM-SM or PIM-SSM or PIM-DM, the instructions further cause the processor to:

receive a multicast group join message for the multicast flow sent by a client connected to PIM router, and send a PIM join message in the direction of the multicast source.

15. The PIM router of claim 14, wherein the instructions further cause the processor to:

determine whether a multicast routing table entry has been established for the multicast flow in the PIM router after receiving the PIM join message from the downstream PIM router or the multicast group join message from the client, to add a port from which the PIM join message or the multicast group join message is received into an egress port list in the multicast routing table entry, and to perform the sending the PIM join message in the direction of the multicast source.

16. The PIM router of claim 10, wherein when the PIM router adopts PIM-SM and is not a DR, or adopts bi-directional PIM and is not a DR, the instructions cause the processor to send a PIM join message in the direction of a multicast source of each multicast flow according to a multicast routing table entry corresponding to the multicast flow when the first hop PIM router was not a DR and becomes a DR.

17. The PIM router of claim 10, wherein when the PIM router adopts PIM-DM, the instructions cause the processor to receive a PIM graft message for the multicast flow from a downstream PIM neighbor, and to send a PIM join message in the direction of the multicast source.

18. The PIM router of claim 17, wherein the instructions further cause the processor to:

determine whether a multicast routing table entry corresponding to the multicast flow has been established in the PIM router after receiving a PIM graft message for the multicast flow from a downstream PIM neighbor, to add the port from which the PIM graft message is received into an egress port list of the multicast routing table entry and to send a PIM join message in the direction of the multicast source when determining the multicast routing table entry has been established and the egress port list of the multicast routing table entry is empty.

19. A method for pruning a multicast branch, said method comprising:

receiving, by a layer-2 exchange, a PIM prune message for a multicast flow;

adding, by the layer-2 exchange, a port from which the PIM prune message is received into a list of egress ports in a PIM snooping entry corresponding to the multicast flow;

marking the port in the list of egress ports as a prune port;

setting a lifetime value for the prune port smaller than a lifetime value of an entry of the multicast flow corresponding to the PIM prune message in a hop PIM router; and stopping forwarding the multicast flow via the port that is marked as the prune port.

20. The method of claim 19, further comprising:

establishing, by the layer-2 exchange, a PIM snooping entry for the multicast flow in response to a determination that a PIM snooping entry has not been established for the multicast flow in the layer-2 exchange, adding all ports connected to PIM neighbors except upstream ports and prune ports into the PIM snooping entry; and forwarding, by the layer-2 exchange, the PIM prune message in the direction of the multicast source in response to a determination that the multicast flow corresponding to the PIM prune message is not to be forwarded.

21. The method of claim 19, further comprising:

receiving, by the layer-2 exchange, a PIM join message for a multicast flow;

deleting, by the layer-2 exchange, a mark which labels the port from which the PIM join message is received as a prune port after forwarding the PIM join message in the direction of the multicast source, and labeling the port as a router port;

deleting, by the layer-2 exchange, the PIM snooping table entry corresponding to the multicast flow in response to a determination that the PIM snooping table entry does not include a prune port; and forwarding, by the layer-2 exchange, the PIM join message in the direction of the multicast source in response to a determination that there is no other port that is to receive the multicast flow.

* * * * *